US010837415B2

(12) United States Patent
Yamamoto et al.

(10) Patent No.: US 10,837,415 B2
(45) Date of Patent: Nov. 17, 2020

(54) STRADDLE-TYPE VEHICLE

(71) Applicant: Kawasaki Jukogyo Kabushiki Kaisha, Kobe-shi, Hyogo (JP)

(72) Inventors: Norimasa Yamamoto, Kakogawa (JP); Hiroshi Kato, Kakogawa (JP); Naoto Yoshida, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 767 days.

(21) Appl. No.: 15/505,048

(22) PCT Filed: Aug. 19, 2014

(86) PCT No.: PCT/JP2014/004216
§ 371 (c)(1),
(2) Date: Feb. 17, 2017

(87) PCT Pub. No.: WO2016/027287
PCT Pub. Date: Feb. 25, 2016

(65) Prior Publication Data
US 2017/0276103 A1    Sep. 28, 2017

(51) Int. Cl.
*F01N 3/20*          (2006.01)
*F02D 41/14*         (2006.01)
(Continued)

(52) U.S. Cl.
CPC ......... *F02M 35/10157* (2013.01); *F01N 3/20* (2013.01); *F01N 3/24* (2013.01);
(Continued)

(58) Field of Classification Search
CPC .... F01N 3/20; F01N 3/24; F02B 33/32; F02B 33/44; F02B 39/04; F02B 39/16;
(Continued)

(56) References Cited

U.S. PATENT DOCUMENTS 9,810,122 B2 * 11/2017 Martin .................. F01N 3/2066
2004/0060535 A1 *  4/2004 Osawa .................. B60K 6/445
                                                              123/198 DB
(Continued)

FOREIGN PATENT DOCUMENTS

JP    S5669434 A    6/1981
JP    H0374514 A    3/1991
(Continued)

OTHER PUBLICATIONS

JP2001-152942 Tamura et al. (translation) (Year: 2001).*
(Continued)

*Primary Examiner* — Phutthiwat Wongwian
*Assistant Examiner* — Diem T Tran
(74) *Attorney, Agent, or Firm* — Alleman Hall Creasman & Tuttle LLP

(57) ABSTRACT

A straddle-type vehicle comprises a supercharging device which compresses intake-air to be sent to a combustion chamber of an engine; a catalyst provided in an exhaust passage through which an exhaust gas emitted from the engine flows; and a control section which controls the engine, wherein the control section performs an increase suppressing control for suppressing an increase in an exhaust gas temperature, in a case where the control section estimates that the exhaust gas temperature has exceeded an increase suppressing temperature set to be equal to or lower than a catalyst permissible temperature.

12 Claims, 9 Drawing Sheets

(51) Int. Cl.

| | | |
|---|---|---|
| *F02M 35/10* | (2006.01) | |
| *F01N 3/24* | (2006.01) | |
| *F02B 39/16* | (2006.01) | |
| *F02D 41/00* | (2006.01) | |
| *F02D 41/22* | (2006.01) | |
| *F02D 41/04* | (2006.01) | |
| *F02D 41/30* | (2006.01) | |
| *F02B 33/32* | (2006.01) | |
| *F02B 33/44* | (2006.01) | |
| *F02D 23/02* | (2006.01) | |
| *F02M 35/02* | (2006.01) | |
| *F02M 35/16* | (2006.01) | |
| *F02B 39/04* | (2006.01) | |
| *F02B 67/10* | (2006.01) | |
| *F02D 23/00* | (2006.01) | |
| *F02M 69/04* | (2006.01) | |

(52) U.S. Cl.
CPC .............. *F02B 33/32* (2013.01); *F02B 33/44* (2013.01); *F02B 39/16* (2013.01); *F02D 23/02* (2013.01); *F02D 41/0002* (2013.01); *F02D 41/04* (2013.01); *F02D 41/1446* (2013.01); *F02D 41/1447* (2013.01); *F02D 41/22* (2013.01); *F02D 41/30* (2013.01); *F02M 35/021* (2013.01); *F02M 35/162* (2013.01); *F02B 39/04* (2013.01); *F02B 67/10* (2013.01); *F02D 23/00* (2013.01); *F02D 2200/0404* (2013.01); *F02D 2200/0804* (2013.01); *F02D 2200/101* (2013.01); *F02D 2200/602* (2013.01); *F02M 69/044* (2013.01); *Y02T 10/12* (2013.01); *Y02T 10/40* (2013.01)

(58) Field of Classification Search
CPC ............. F02B 67/10; F02D 2200/0404; F02D 2200/0804; F02D 2200/101; F02D 2200/602; F02D 23/00; F02D 23/02; F02D 41/0002; F02D 41/04; F02D 41/1446; F02D 41/1447; F02D 41/22; F02D 41/30; F02M 35/021; F02M 35/10157; F02M 35/162; F02M 69/044; Y02T 10/144; Y02T 10/42

See application file for complete search history.

(56) References Cited

U.S. PATENT DOCUMENTS

| | | | |
|---|---|---|---|
| 2006/0218899 A1* | 10/2006 | Narita | F01N 3/0821 60/285 |
| 2013/0220241 A1* | 8/2013 | Takiguchi | F01P 7/167 123/41.1 |
| 2014/0230760 A1* | 8/2014 | Okamoto | F01P 7/026 123/41.05 |
| 2015/0094919 A1* | 4/2015 | Nozaki | F16H 61/0213 701/56 |

FOREIGN PATENT DOCUMENTS

| | | |
|---|---|---|
| JP | H05296052 A | 11/1993 |
| JP | 2001152942 A | 6/2001 |
| JP | 2005076468 A | 3/2005 |
| JP | 2005220778 A | 8/2005 |
| KR | 20090025440 A | 3/2009 |
| WO | 2011046098 A1 | 4/2011 |
| WO | 2012123634 A1 | 9/2012 |

OTHER PUBLICATIONS

JPH05296052 Hitomi et al. (translation) (Year: 1993).*
ISA Japanese Patent Office, Written Opinion of the International Searching Authority Issued in Application No. PCT/JP2014/004216, dated Oct. 7, 2014, WIPO, 7 pages.
ISA Japanese Patent Office, International Search Report Issued in Application No. PCT/JP2014/004216, dated Oct. 7, 2014, WIPO, 2 pages.

* cited by examiner

STRADDLE-TYPE VEHICLE

TECHNICAL FIELD

The present invention relates to a straddle-type vehicle. In particular, the present invention relates to a straddle-type vehicle including a supercharging device which compresses intake-air.

BACKGROUND ART

Some straddle-type vehicles such as a motorcycle include supercharging devices, each of which compresses intake-air to be supplied to a combustion chamber of an engine (see e.g., Patent Literature 1).

CITATION LIST

Patent Literature

Patent Literature 1: International Publication No. 2011/046098 Specification

SUMMARY OF INVENTION

Technical Problem

However, in the above-described straddle-type vehicle including the supercharging device, air is forcibly delivered to the engine. For this reason, an exhaust gas emitted from the engine is different from that in a case where the vehicle does not include the supercharging device. Therefore, it is necessary to properly perform an engine control according to a state of the exhaust gas. In some cases, rider's traveling feeling is affected by performing such an engine control.

An object of the present invention is to provide a straddle-type vehicle which can reduce effects on traveling feeling which are caused by performing an engine control, while performing the engine control according to a state of an exhaust gas.

According to an aspect of the present invention, a straddle-type vehicle comprises a supercharging device which compresses intake-air to be sent to a combustion chamber of an engine; a catalyst provided in an exhaust passage through which an exhaust gas emitted from the engine flows; and a control section which controls the engine, wherein the control section performs an increase suppressing control for suppressing an increase in an exhaust gas temperature, in a case where the control section estimates that the exhaust gas temperature has exceeded an increase suppressing temperature set to be equal to or lower than a catalyst permissible temperature.

In accordance with this configuration, since the control section performs the increase suppressing control before the catalyst is damaged by burning, the increase in the exhaust gas temperature can be suppressed, and thus the catalyst can be protected. Therefore, the engine control can be performed depending on the state of the exhaust gas. In addition, since a degree of the increase in the exhaust gas temperature is suppressed while permitting the increase in the exhaust gas temperature, the traveling feeling is less affected by performing the increase suppressing control.

The control section may perform a cylinder combustion ceasing control for ceasing combustion in a cylinder of the engine in a case where a predetermined cylinder combustion ceasing condition is met, and an initiation condition of the increase suppressing control may be set so that the increase suppressing control is performed before the cylinder combustion ceasing control is performed. During the cylinder combustion ceasing control, since the combustion in the cylinder does not take place, an uncombusted gas easily reaches the catalyst, and the exhaust gas temperature sometimes increases rapidly. In accordance with the above-described configuration, the increase suppressing control is performed before the cylinder combustion ceasing control is performed. Therefore, even if the cylinder combustion ceasing control is performed after the increase suppressing control is performed, effects on the exhaust gas temperature due to creasing the combustion in the cylinder can be suppressed, and the catalyst can be protected.

The control section may perform the cylinder combustion ceasing control in a case where an engine speed has reached a predetermined upper limit engine speed, and the control section may perform the increase suppressing control in a case where the engine speed has exceeded an increase suppressing engine speed set to be lower than the upper limit engine speed. In accordance with this configuration, each of the cylinder combustion ceasing control and the increase suppressing control is set based on the engine speed. This makes it possible to effectively suppress a rapid increase in the catalyst temperature, which occurs, when the engine speed has reached the upper limit engine speed.

The control section may estimate whether or not the exhaust gas temperature has exceeded the increase suppressing temperature set to be equal to or lower than the catalyst permissible temperature, based on a value corresponding to a throttle valve opening degree and an engine speed. In accordance with this configuration, it becomes possible to eliminate a need for an exhaust gas temperature sensor, which can reduce the number of members. In addition, since the increase suppressing temperature can be set irrespective of the permissible temperature of the exhaust gas temperature sensor, the increase suppressing control can be properly performed even in a case where the catalyst permissible temperature is higher than the permissible temperature of the exhaust gas temperature sensor.

The straddle-type vehicle may comprise a transmission provided in a driving power transmission path from the engine to a drive wheel, the transmission may have a plurality of transmission ratios, and a condition used to initiate the increase suppressing control may be set so that the increase suppressing control is performed more easily in a case where the transmission ratio is lower than in a case where the transmission ratio is higher. In accordance with this configuration, the increase suppressing control is initiated at an earlier time, in the state in which the transmission ratio is lower and the engine speed tends to continue to be high than in the state in which the transmission ratio is higher. This makes it possible to advance the timing at which the increase suppressing control is initiated, in a case where the catalyst temperature is likely to increase. Also, the increase suppressing control is initiated at a later time, in the state in which the transmission ratio is higher and the engine speed tends to become higher for a moment, than in the state in which the transmission ratio is lower. This makes it possible to prevent the increase suppressing control from being unnecessarily performed.

The control section may perform the increase suppressing control in such a manner that an intake-air flow rate is suppressed to be lower than that in a case where the increase suppressing control is not performed. In accordance with this configuration, since the flow rate of the intake-air flowing into the combustion chamber of the engine is reduced, the combustion in the combustion chamber is suppressed, and thus the increase in the exhaust gas temperature can be suppressed. The control section may perform the increase suppressing control in such a manner that a cross-sectional area of an air-intake passage becomes smaller than that in a case where the increase suppressing control is not performed. In accordance with this configuration, since the flow rate per unit time, of the intake-air flowing into the combustion chamber of the engine is reduced, the combustion in the combustion chamber is suppressed, and thus the increase in the exhaust gas temperature can be suppressed. The control section may perform the increase suppressing control in such a manner that an increase in a supercharging pressure applied by the supercharging device is suppressed more than in a case where the increase suppressing control is not performed. In accordance with this configuration, since the increase in the pressure of the intake-air is suppressed, and thereby the density of the intake-air in the interior of the combustion chamber of the engine is reduced, the combustion in the combustion chamber is suppressed, and thus the increase in the exhaust gas temperature can be suppressed.

The control section may perform the increase suppressing control in such a manner that an amount of fuel to be supplied to the engine is increased to be greater than that in a case where the increase suppressing control is not performed. In accordance with this configuration, the temperature of the intake-air can be reduced by evaporation heat. Therefore, the increase suppressing control can be performed without suppressing the increase in the engine output, and thus traveling feeling is affected less. In addition, since it is not necessary to additionally provide a particular device for cooling the intake-air, the temperature increase can be suppressed without increasing the number of members.

The increase suppressing control may include a plurality of increase suppressing stages, and initiation conditions which are different and are used to initiate the plurality of increase suppressing stages, respectively, are set to correspond to the plurality of increase suppressing stages, respectively. The control section may perform the increase suppressing control in such a manner that an amount of fuel to be supplied to the engine is increased to be greater than that in a case where the increase suppressing control is not performed, and then the intake-air flow rate is suppressed to be lower than that in a case where the increase suppressing control is not performed. In accordance with this configuration, since the increase suppressing control is performed in a stepwise manner, the engine control which does not affect the traveling feeling so much can be initiated earlier.

The above and further objects, features and advantages of the present invention will more fully be apparent from the following detailed description of preferred embodiment with reference to accompanying drawings.

Advantageous Effects of Invention

The present invention has been configured as described above, and obtains an advantage that effects on traveling feeling which are caused by performing an engine control, can be reduced, while performing the engine control according to a state of an exhaust gas.

DESCRIPTION OF EMBODIMENTS

Hereinafter, the embodiments of the present invention will be described with reference to the drawings. In the present embodiment, a motorcycle will be exemplarily described as a straddle-type vehicle.

Figure 1:
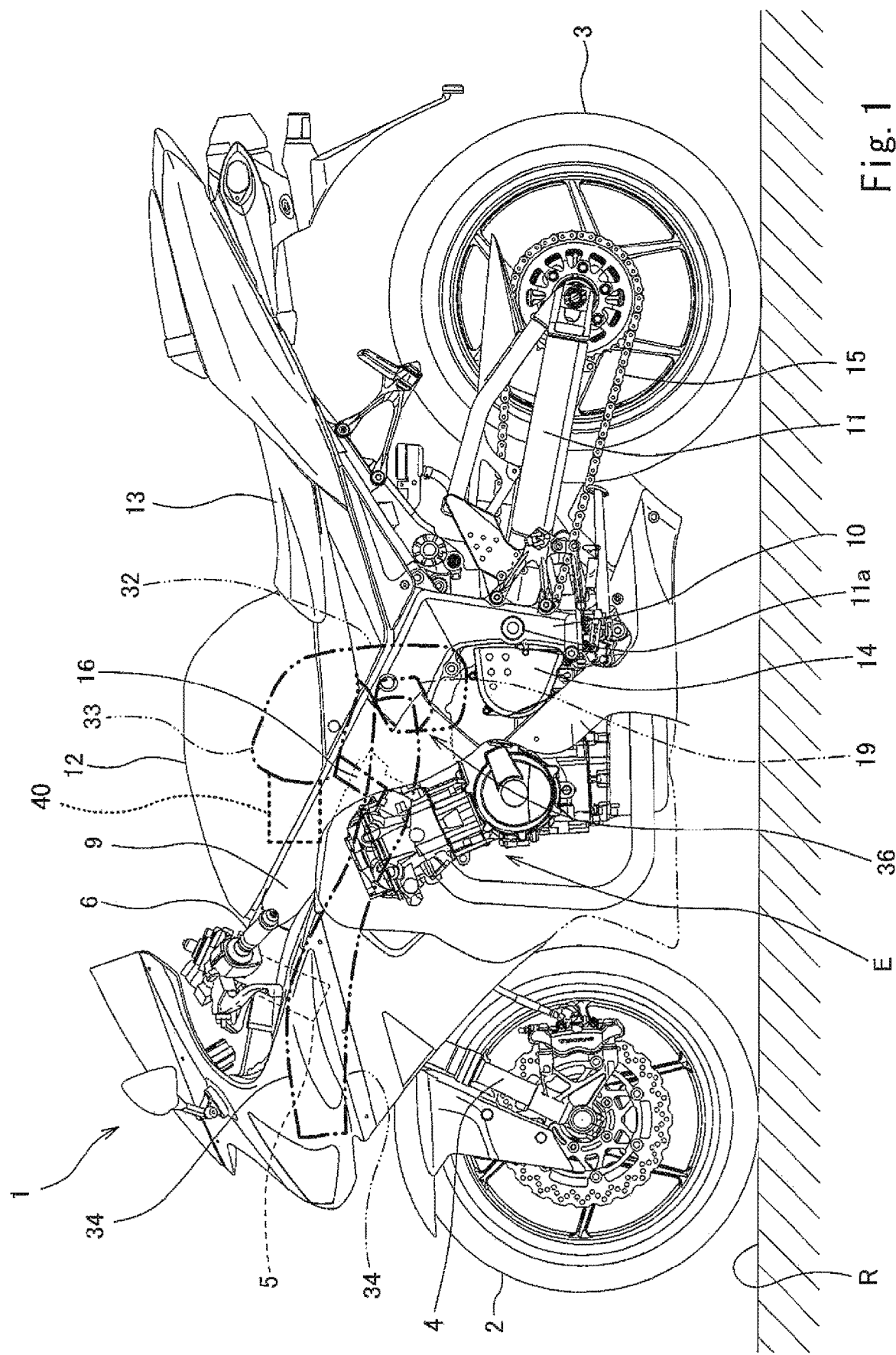
FIG. 1 is a left side view showing a motorcycle according to the embodiment of the present invention.
Figure 2:
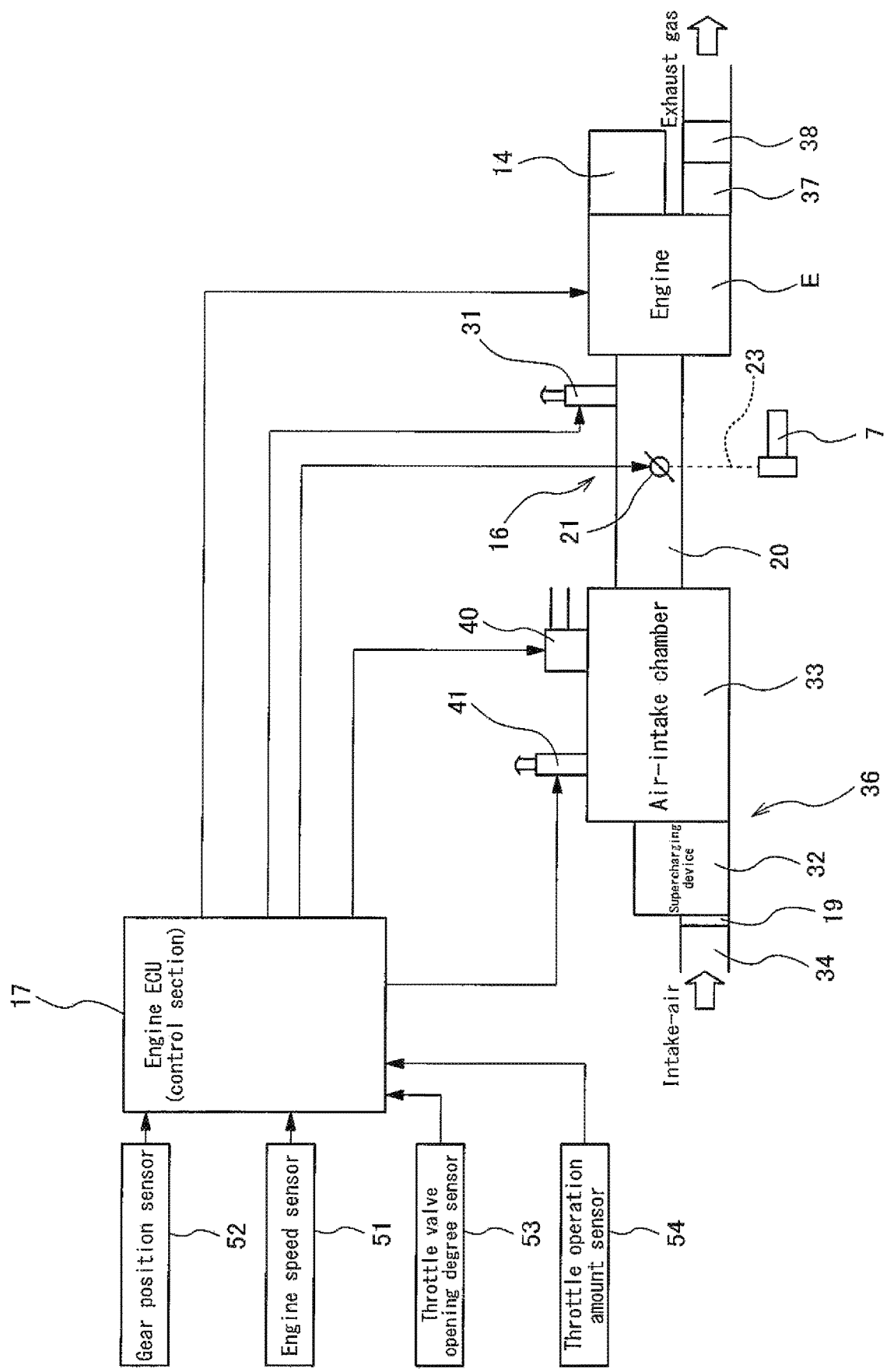
FIG. 2 is a block diagram showing the schematic configuration of an air-intake passage and an exhaust passage of the motorcycle of FIG. 1.

FIG. 1 is a left side view showing a motorcycle according to the embodiment of the present invention. FIG. 2 is a block diagram showing the schematic configuration of an air-intake passage and an exhaust passage of the motorcycle of FIG. 1. As shown in FIG. 1, a motorcycle 1 includes a front wheel 2 and a rear wheel 3 which roll on a road surface R. The rear wheel 3 is a drive wheel, and the front wheel 2 is a driven wheel. The front wheel 2 is rotatably mounted to the lower end portion of a front fork 4 vertically extending. The front fork 4 is supported by a steering shaft. The steering shaft is rotatably supported by a head pipe 5. A bar-type steering handle 6 extending in a rightward and leftward direction is attached to an upper bracket.

A throttle grip 7 (see FIG. 2) provided at a portion of the handle 6 which can be gripped by the rider's right hand is a throttle input member which is rotated by twisting the rider's wrist to operate a throttle device 16 which will be described later. The rider rotates the handle 6 to turn the front wheel 2 in a desired direction around the steering shaft as a rotational shaft.

A pair of right and left main frames 9 extend rearward from the head pipe 5 in such a manner that the main frames 9 are tilted in a downward direction. A pair of right and left pivot frames 10 are connected to the rear portions of the pair of right and left main frames 9, respectively. The front end portions of a swing arm 11 extending in a substantially forward and rearward direction are mounted to the pivot frames 10 in such a manner that the swing arm 11 is pivotable. The rear wheel 3 is mounted to the rear end portion of the swing arm 11 in such a manner that the rear wheel 3 is pivotable around a pivot shaft 11a. The pivot shaft 11a of the swing arm 11 is disposed rearward relative to the rear end portion of an engine E. A fuel tank 12 is disposed rearward relative to the handle 6, and a straddle seat 13 which can be straddled by the rider is disposed behind the fuel tank 12.

Between the front wheel 2 and the rear wheel 3, the engine E is mounted to the main frames 9 and the pivot frames 10. FIG. 1 shows as the engine E an inline four-cylinder engine including four cylinders arranged in a vehicle width direction. A transmission 14 is connected to the output shaft of the engine E. Driving power output from the transmission 14 is transmitted to the rear wheel 3 via a chain 15. The engine E and the transmission 14 are integrated in such a manner that a transmission case of the transmission 14 is located behind a crankcase of the engine E. When viewed from a side, the axes of the cylinders are tilted in a forward direction as they extend in an upward direction. When viewed from the side, the crankcase of the engine E and the transmission case of the transmission 14 have a substantially L-shape as a whole. In other words, the engine E and the transmission 14 comprise the L-shaped case.

An air-intake device 36 is disposed upstream of the engine E, connected to the engine E via the air-intake passage 20, and located below the fuel tank 12. The air-intake device 36 includes a supercharging device 32 which compresses the intake-air, and an air-intake chamber 33 disposed downstream of the supercharging device 32. Upstream of the supercharging device 32, an air-intake duct 34 into which air flowing from forward is introduced, and an air cleaner 19 located between the air-intake duct 34 and the supercharging device 32, are disposed. The intake-air introduced through the air-intake duct 34 is sent to the supercharging device 32 via an air cleaner 19. In other words, the supercharging device 32 is disposed downstream of the air cleaner 19. The supercharging device 32 has a supercharging shaft (not shown) which can be driven by driving power of the engine E which is transmitted through a driving power transmission mechanism such as gears and a chain, namely the rotation of a crankshaft, and compresses the intake-air sent to the supercharging device 32. The supercharging device 32 includes a centrifugal pump and an epicyclic gear mechanism. The supercharging device 32 is configured to increase the speed of the driving power of the engine E. The centrifugal pump and the epicyclic gear mechanism are coaxial with each other. The centrifugal pump and the epicyclic gear mechanism are mounted to the upper wall portion of the transmission case.

The throttle device 16 is disposed between the air-intake chamber 33 and intake ports (not show) of the engine E and adjusts the flow rate of the intake-air to be supplied from the air-intake device 36 to the engine E. The throttle device 16 is disposed inside the main frames 9.

The supercharging device 32 can increase the output of the motorcycle 1. The intake-air which has been compressed by the supercharging device 32 is sent to the air-intake chamber 33. The air-intake chamber 33 stores therein the intake-air having been compressed by the supercharging device 32 and then guides (leads) the intake-air to a combustion chamber of the engine E through the throttle device 16. The air-intake chamber 33 serves to suppress a change in a pressure in the air-intake passage. With an increase in the volume of the air-intake chamber 33, the output of the motorcycle 1 is increased. The air which has been consumed in the combustion of the engine E is discharged through an exhaust passage 37. The exhaust passage 37 is provided with a catalyst 38 for converting harmful substances contained in the exhaust gas into harmless substances. A ternary (three-way) catalyst is used as the catalyst 38. The present embodiment is suitably used in a gasoline engine whose running rotational range is higher, rather than a diesel engine whose running rotational range is lower. This is because the temperature of the catalyst 38 tends to be elevated in a high engine speed range.

Instead of using the driving power of the engine E as a driving force for driving the supercharging device 32, a drive source such as a motor may be additionally provided to drive the supercharging device 32, or the driving force may be taken out of exhaust gas energy. A pressure rising suppressing mechanism 40 for suppressing an increase in the pressure in the air-intake chamber 33 is mounted to the air-intake chamber 33. The pressure rising suppressing mechanism 40 is configured to perform switching in response to a control command provided by an engine ECU 17 to the pressure rising suppressing mechanism 40, between a state in which the inner space of the air-intake chamber 33 and a relief space connected to the air-intake duct 34 located upstream of the supercharging device 32 are in communication with each other (pressure increase is suppressed), and a state in which the inner space of the air-intake chamber 33 and the relief space are disconnected from each other (pressure increase is permitted).

The throttle device 16 includes a throttle valve 21 disposed at an intermediate portion of the air-intake passage 20. In the present embodiment, the throttle valve 21 is connected to the throttle grip 7 via an electric wire 23. The throttle valve 21 is configured as an electronically controlled throttle which is opened or closed in response to an electric signal based on the rider's operation of the throttle grip 7.

The throttle device 16 is provided with a fuel injection device which injects fuel into the air-intake passage 20. In the present embodiment, the fuel injection device includes a main injector 31 disposed downstream of the throttle valve 21, and a sub-injector (top injector) disposed upstream of the throttle valve 21. The fuel reserved in the fuel tank 12 is delivered to the main injector 31 and the sub-injector 41 via a fuel pump (not shown). The sub-injector 41 is configured to inject the fuel into the air-intake chamber 33. The transmission 14 changes the driving power of the engine E and then transmits the driving power to the rear wheel 3. The transmission 14 is provided with a clutch (not shown) which transmits or cuts off the driving power. The transmission 14 has a plurality of (e.g., six) transmission ratios, one of which is selectable. More specifically, the transmission 14 has a plurality of gear positions corresponding to the plurality of transmission ratios, respectively. The motorcycle 1 includes a gear position sensor 52 which detects the gear position of the transmission 14. The gear position of the transmission 14 is transmitted from the gear position sensor 52 to the engine ECU 17.

The engine ECU 17 is a control section which performs calculation relating to an engine control based on signals received from sensors and switches, by electric power supplied from a battery (not shown), and provides control commands to electric devices, respectively. The sensors associated with the engine control are, for example, an engine speed sensor 51, the gear position sensor 52, a throttle valve opening degree sensor 53, a throttle operation amount sensor 54, etc. The electric devices are ignition system devices such as an igniter, air-intake system devices such as the fuel injection device and an electric throttle valve, cooling system devices such as a cooling fan, sensors used for the driving control of the engine, the engine ECU 17, lamp units, audio units, etc.

A memory section of the engine ECU 17 contains therein programs used to cease combustion in the cylinder and each control for suppressing an increase in an exhaust gas temperature, which will be described later. In addition, the memory section contains therein an upper limit engine speed and an increase suppressing engine speed (which will be described later) of the engine speed. Further, the memory section contains therein thresholds and set values used in the controls which will be described later.

When a predetermined cylinder combustion ceasing condition is met, the engine ECU 17 performs a cylinder combustion ceasing control for ceasing the combustion in the cylinder of the engine E. The cylinder combustion ceasing condition is set as, for example, an upper limit value (over rev limit) of the engine speed. When the engine speed has exceeded a predetermined upper limit engine speed, the engine ECU 17 performs a fire (flame) extinction control including at least one of ceasing fuel injection performed by the injector 31, 41, ceasing ignition in the engine E, and the like, as the cylinder combustion ceasing control. In the cylinder combustion ceasing control, the engine ECU 17 performs the above-described fire extinction control so that the engine speed becomes equal to or lower than the upper limit engine speed.

The engine ECU 17 is configured to perform the control for suppressing the increase in the exhaust gas temperature, in a case where the engine ECU 17 estimates that the exhaust gas temperature has exceeded an increase suppressing temperature set to be equal to or lower than a predetermined catalyst permissible (allowable) temperature.

The catalyst permissible temperature indicates a highest temperature at which the catalyst 38 is not damaged by burning. For example, the catalyst permissible temperature may be set to a dissolution temperature of a brazing material for carrying (supporting) the catalyst 38. The catalyst permissible temperature may be set to, for example, a value which is equal to or higher than 1000 degrees C., for example, 1400 degrees C. In this case, the increase suppressing temperature is set to be lower than 1000 degrees C., for example, 950 degrees C. For example, the permissible temperature of the exhaust gas temperature sensor is set to about 850 degrees C. For this reason, in a case where the catalyst permissible temperature is equal to or higher than 1000 degrees C., the exhaust gas temperature cannot be used. In light of this, in the present embodiment, the engine ECU 17 determines whether or not the exhaust gas temperature has exceeded the increase suppressing temperature set to be equal to or lower than the catalyst permissible temperature, based on a value corresponding to the throttle valve opening degree and the engine speed.

In the present embodiment, the motorcycle 1 includes the engine speed sensor 51 which measures the engine speed. In addition, the motorcycle 1 includes the throttle valve opening degree sensor 53 which measures the opening degree of the throttle valve 21, and the throttle operation amount sensor 54 which measures the operation amount of the throttle grip 7, as the sensor which measures the throttle valve opening degree. The engine ECU 17 determines whether or not the exhaust gas temperature has exceeded the increase suppressing temperature, based on the engine speed which is measured by the engine speed sensor 51, and the value corresponding to the throttle valve opening degree measured by at least one of the throttle valve opening degree sensor 53 and the throttle operation amount sensor 54.

When the engine ECU 17 determines that the exhaust gas temperature has exceeded the increase suppressing temperature, it performs a predetermined increase suppressing control (this will be described later) for suppressing the increase in the exhaust gas temperature.

In accordance with the above-described configuration, since the engine ECU 17 performs the increase suppressing control before the catalyst 38 is damaged by burning, the increase in the exhaust gas temperature can be suppressed, and thus the catalyst 38 can be protected. Therefore, the engine control can be performed based on the state of the exhaust gas. In addition, since a degree of the increase in the exhaust gas temperature is suppressed while permitting the increase in the exhaust gas temperature, the traveling feeling is less affected by performing the increase suppressing control. The temperature of the catalyst 38 tends to be increased, in a case where the engine speed has reached an upper limit engine speed while the engine E is running at a high speed, in particular, during acceleration, or a case where the transmission 14 is downshifted during deceleration. In particular, the engine E of the motorcycle runs at a higher engine speed than that of a four-wheeled vehicle (automobile). For this reason, the temperature of the catalyst 38 tends to be elevated at a high change rate in the motorcycle. Therefore, the configuration of the present embodiment is effectively used in the motorcycle.

In the present embodiment, the engine ECU 17 determines whether or not the exhaust gas temperature has exceeded the increase suppressing temperature, based on the value corresponding to the throttle valve opening degree and the engine speed, without directly measuring the exhaust gas temperature. This makes it possible to eliminate a need for the exhaust gas temperature sensor, which can reduce the number of members. In addition, since the increase suppressing temperature can be set irrespective of the permissible temperature of the exhaust gas temperature sensor, the increase suppressing control can be properly performed even in a case where the increase suppressing temperature is higher than the permissible temperature of the exhaust gas temperature sensor.

The initiation condition of the increase suppressing control is set so that the increase suppressing control is performed before the cylinder combustion ceasing control is performed. Specifically, as described above, the engine ECU 17 performs the cylinder combustion ceasing control in a case where the engine speed has reached the predetermined upper limit engine speed. In addition, the engine ECU 17 performs the increase suppressing control in a case where the engine speed has exceeded the increase suppressing engine speed set to be lower than the upper limit engine speed. The increase suppressing engine speed at which the increase suppressing control is initiated is set based on the throttle valve opening degree. In other words, the threshold of the throttle valve opening degree at which the increase suppressing control is initiated is set based on the engine speed in an engine speed range lower than the upper limit engine speed.

Figure 3:
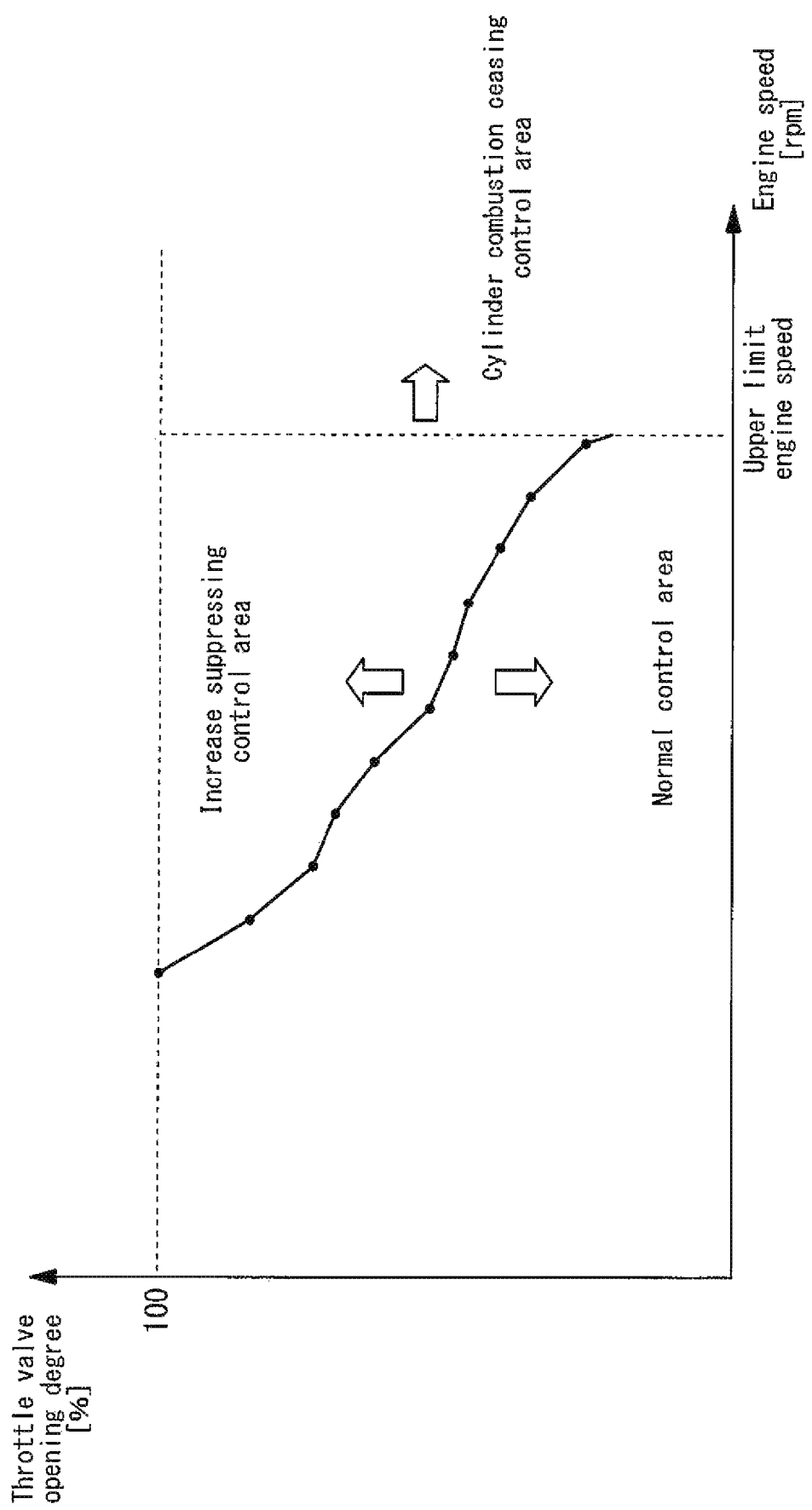
FIG. 3 is a graph showing a threshold of a throttle valve opening degree with respect to an engine speed, which defines an initiation condition used to perform an increase suppressing control according to the embodiment.

FIG. 3 is a graph showing the threshold of the throttle valve opening degree with respect to the engine speed, which defines the initiation condition used to perform the increase suppressing control according to the embodiment. In the example of FIG. 3, the increase suppressing control is performed based on the throttle valve opening degree received from the throttle valve opening degree sensor 53, as the value corresponding to the throttle valve opening degree. As shown in FIG. 3, in an area (normal control area) in which the throttle valve opening degree is equal to or less than a threshold (hereinafter this will be referred to as an opening degree threshold) set based on the engine speed, the engine ECU 17 does not perform the increase suppressing control and performs a normal engine output control. In contrast, in an area (increase suppressing control area) in which the throttle valve opening degree is greater than the opening degree threshold, the engine ECU 17 estimates that the exhaust gas temperature and hence the temperature of the catalyst 38 have exceeded the increase suppressing temperature, and performs the increase suppressing control.

The exhaust gas temperature has a correlation with the throttle valve opening degree and the engine speed. Therefore, the engine ECU 17 can estimate the exhaust gas temperature from the engine speed received from the engine speed sensor 51 and the value corresponding to the throttle valve opening degree received from the throttle valve opening degree sensor 53. In other words, in a case where a condition of the throttle valve opening degree at which the exhaust gas temperature is estimated to exceed the increase suppressing temperature and a condition of the engine speed at which the exhaust gas temperature is estimated to exceed the increase suppressing temperature are met, the ECU 17 can estimate that the exhaust gas temperature has exceeded the increase suppressing temperature. Therefore, in a case where the throttle valve opening degree has exceeded the opening degree threshold as described above, it may be said that the engine speed has exceeded the increase suppressing engine speed.

For example, the memory section of the engine ECU 17 contains therein an opening degree threshold table in which the opening degree threshold is set for each predetermined engine speed. The maximum value of the engine speeds (namely, increase suppressing engine speeds) corresponding to these opening degree thresholds is set to be lower than the upper limit engine speed. In this case, for example, at a specified timing at which the opening degree threshold table is stored, the engine ECU 17 sets a value derived by interpolating two opening degree thresholds corresponding to adjacent engine speeds, respectively, in the opening degree threshold table, as the opening degree threshold between these engine speeds. Alternatively, the opening degree threshold may be set for each predetermined engine speed range. Specifically, the opening degree threshold corresponding to the engine speed may be set in a discontinuous manner (in a stepwise manner). Specifically, for example, the opening degree thresholds may be such that the opening degree threshold corresponding to the engine speed which is equal to or higher than $N_1$ and lower than $N_2$ ($>N_1$) is a first threshold, the opening degree threshold corresponding to the engine speed which is equal to or higher than $N_2$ and lower than $N_3$ ($>N_2$) is a second threshold, and the opening degree threshold corresponding to the engine speed which is equal to or higher than $N_3$ and lower than $N_4$ ($>N_3$) is a third threshold. Further, a predetermined function may be used to successively set the opening degree threshold corresponding to the engine speed.

In the present embodiment, a specified trend is set, in which the threshold of the throttle valve opening degree is lower as the engine speed is higher. In other words, the increase suppressing control is performed more easily as the engine speed is higher and the throttle valve opening degree is greater. At a time point when the engine speed has exceeded the upper limit engine speed, the cylinder combustion ceasing control is initiated irrespective of the throttle valve opening degree. The threshold of the throttle opening degree which is used to determine whether or not to perform the increase suppressing control is not limited to the above-described trend, and may be other trends.

During the cylinder combustion ceasing control, since the combustion in the cylinder does not take place, an uncombusted gas easily reaches the catalyst, and the exhaust gas temperature sometimes increases rapidly. In particular, in the motorcycle including the supercharging device 32, an air-intake pressure tends to become high. For this reason, in some cases, the uncombusted fuel gas in a high-temperature state in the engine E is forcibly delivered to the exhaust passage 37 by the supercharging device 32, and combusted in the interior of the exhaust passage 37. This may result in a rapid increase in the temperature of the catalyst 38. However, in accordance with the above-described configuration, the increase suppressing control is performed before the cylinder combustion ceasing control is performed. Therefore, even when the cylinder combustion ceasing control is performed after the increase suppressing control is performed, effects on the exhaust gas temperature due to creasing the combustion in the cylinder can be suppressed, and the catalyst can be protected. In addition, in accordance with the above-described configuration, each of the cylinder combustion ceasing control and the increase suppressing control is set based on the engine speed. This makes it possible to effectively suppress a rapid increase in the catalyst temperature, which occurs, when the engine speed has reached the upper limit engine speed.

In the present embodiment, the increase suppressing engine speed is set in a case where the transmission ratio of the transmission 14 is lower than a predetermined value (reference transmission ratio). As described above, the transmission 14 of the present embodiment has the plurality of transmission ratios (reduction gear ratios). In a case where the transmission ratio corresponding to the gear position detected by the gear position sensor 52 is lower than the reference transmission ratio (e.g., the transmission ratio of the detected gear position is the transmission ratio corresponding to one of 5th to 6th gear positions), the engine ECU 17 performs the increase suppressing control. On the other hand, in a case where the transmission ratio is equal to or higher the reference transmission ratio (e.g., the transmission ratio of the detected gear position is the transmission ratio corresponding to one of 1st to 4th gear positions), the engine ECU 17 does not perform the increase suppressing control. In this setting, the increase suppressing control is not performed at the gear position corresponding to the higher transmission ratio, at which the engine speed tends to be high during acceleration or deceleration. As a result, the driving feeling is not degraded.

In addition to or instead of this, the condition used to initiate the increase suppressing control may be set so that the increase suppressing control is initiated more easily in a case where the transmission ratio is lower than in a case where the transmission ratio is higher. For example, the increase suppressing engine speed may be set to be lower in a case where the transmission ratio of the transmission 14 is lower than in a case where the transmission ratio is higher. For example, in a case where the increase suppressing control is performed at the 5th gear position and the 6th gear position as described above, the increase suppressing engine speed may be set to be lower at the 6th gear position corresponding to the transmission ratio lower than that of the 5th gear position. Further, in a case where the increase suppressing engine speeds are set to correspond to all of the gear positions, the increase suppressing engine speed may be set to be lower as the number of the gear position is greater. Moreover, the increase suppressing engine speed may be set in the same manner in a case where the transmission 14 is a continuously variable transmission (CVT).

A vehicle speed is higher and a change in the vehicle speed is less, in a state in which the transmission ratio is lower than in a state in which the transmission ratio is higher. Therefore, the engine speed tends to continue to be high. In contrast, the change in the vehicle speed is greater, and the gear position is more frequently shifted, in a state in which the transmission ratio is higher than in a state in which the transmission ratio is lower. Therefore, the engine speed tends to become high for a moment. In view of this, the increase suppressing control is initiated at an earlier time, in the state in which the transmission ratio is lower and the engine speed tends to continue to be high than in the state in which the transmission ratio is higher. This makes it possible to advance the timing at which the increase suppressing control is initiated, in a case where the catalyst temperature is likely to increase. Also, the increase suppressing control is initiated at a later time, in the state in which the transmission ratio is higher and the engine speed tends to become high for a moment, than in the state in which the transmission ratio is lower. This makes it possible to prevent the increase suppressing control from being unnecessarily performed.

Figure 4:
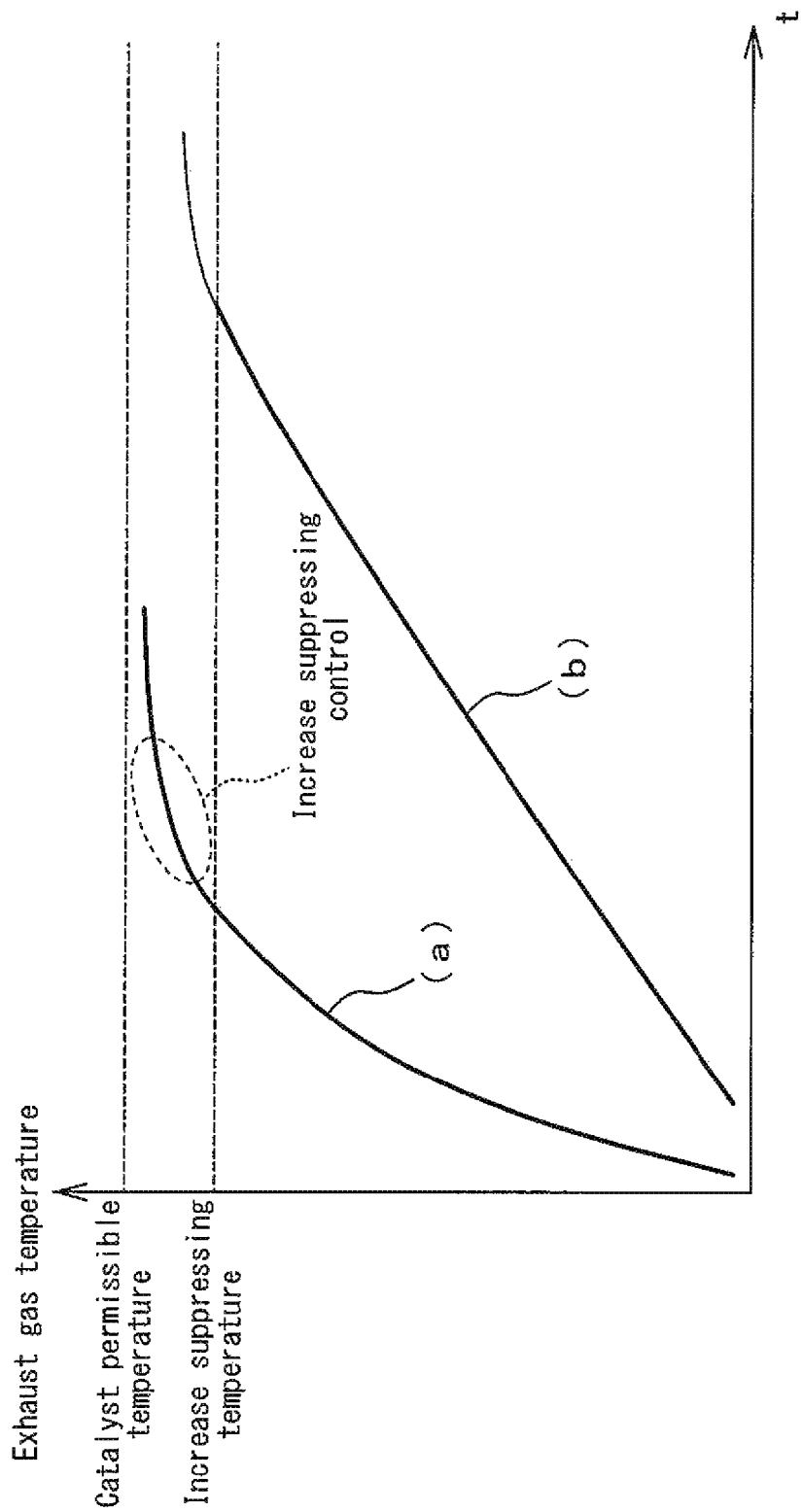
FIG. 4 is a graph showing a change over time of an exhaust gas temperature in a case where the increase suppressing control is performed.

FIG. 4 is a graph showing a change over time of the exhaust gas temperature in a case where the increase suppressing control is performed. In FIG. 4, graph(a) is a graph showing a case where the engine speed gradually increases and graph (b) is a graph showing a case where the engine speed rapidly increases. At the throttle valve opening degree which is smaller, the engine speed gradually increases, while at the throttle valve opening degree which is greater, the engine speed rapidly increases. This trend is more noticeable in the state in which the transmission ratio is higher than in the state in which the transmission ratio is lower. As shown in FIG. 4, when the exhaust gas temperature has exceeded the increase suppressing temperature which is equal to or lower than the catalyst permissible temperature, the increase suppressing control is performed to suppress an increase in the exhaust gas temperature. Note that the increase suppressing control may not be performed in a case where the engine speed gradually increases. The cylinder combustion ceasing control may not be performed.

In the present embodiment, the engine ECU 17 is configured to perform a plurality of engine controls, as the increase suppressing control. Specifically, the increase suppressing control performed by the engine ECU 17 includes a control for suppressing an intake-air flow rate so that the intake-air flow rate becomes lower than that in a case where the increase suppressing control is not performed (hereinafter this control will be referred to as an intake-air flow rate suppressing control), and a control for increasing the amount of fuel to be supplied to the engine E for a specified time so that the amount of fuel becomes greater than that in a case where the increase suppressing control is not performed (hereinafter this control will be referred to as a fuel amount increasing control).

For example, in the motorcycle including the electronically controlled throttle valve 21, of the present embodiment, the intake-air flow rate suppressing control may be performed to reduce the intake-air flow rate in such a manner that the throttle valve 21 is moved to be closed to reduce the cross-sectional area of the air-intake passage 20 so as to make the cross-sectional area smaller than that in a case where the intake-air flow rate suppressing control is not performed. For example, the opening degree of the throttle valve 21 corresponding to the operation amount of the throttle grip 7 is reduced. When a ratio (H/G) of a displacement amount H of the throttle valve 21 to a predetermined grip operation amount G in a case where the increase suppressing control is not performed is ε, this ratio (H/G), in a case where the increase suppressing control is performed, is set to a value smaller than ε. In another example of the intake-air flow rate suppressing control, for example, the increase in the supercharging pressure may be controlled to be suppressed to reduce the intake-air flow rate. The increase in the supercharging pressure may be controlled to be suppressed in such a manner that the pressure rising suppressing mechanism 40 or the supercharging device 32 is operated to suppress the increase in the pressure in the air-intake chamber 33.

Since the intake-air flow rate suppressing control is performed, the increase in the engine output is suppressed while maintaining the combustion in the cylinder of the engine E. To reduce a change in the traveling feeling, reduction of the engine output is preferably minimized even in a case where the increase suppressing control is performed. In other words, the combustion in the cylinder is preferably continued.

By performing the intake-air flow rate suppressing control as the increase suppressing control, a change in the traveling feeling which would occur when the normal control shifts to the intake-air flow rate suppressing control can be reduced, and it is possible to prevent the uncombusted gas from reaching the catalyst 38. In a case where the intake-air flow rate suppressing control is performed by use of the electronically controlled throttle valve 21, the throttle valve opening degree can be controlled at multiple stages depending on the situation. This makes it possible to more effectively reduce the change in the traveling feeling during the increase suppressing control. In a case where a sub-throttle valve is included in the throttle device 16, the intake-air flow rate suppressing control may be performed by controlling the sub-throttle valve to close it, in addition to or instead of the throttle valve 21. In the intake-air flow rate suppressing control, a fuel injection amount is preferably adjusted depending on a change in the intake-air flow rate, to suppress a change in an air-fuel ratio.

In addition to or instead of the intake-air flow rate suppressing control, an ignition timing of the engine E may be retarded, or the fuel injection amount may be reduced.

Figure 5:
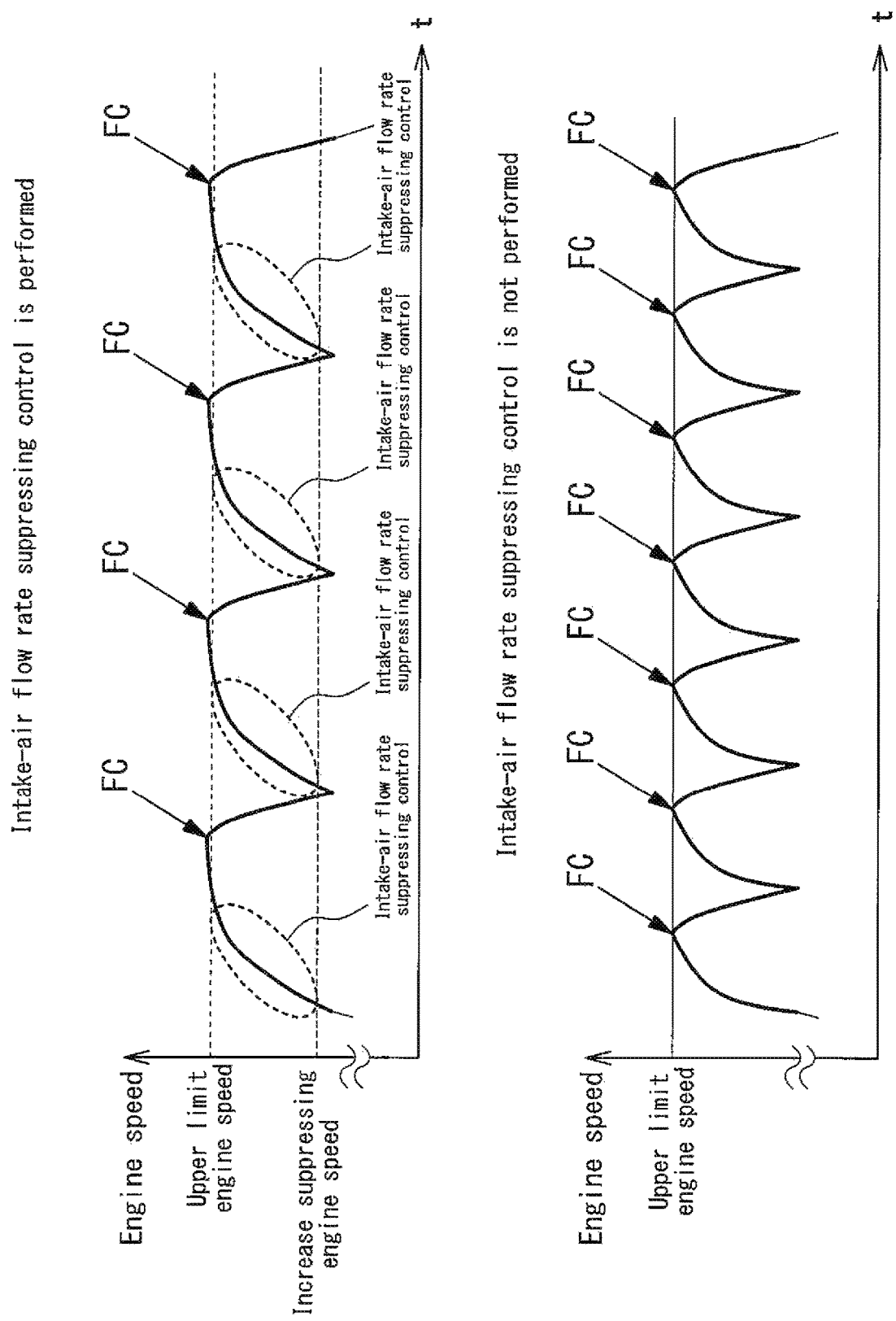
FIG. 5 is a graph showing a change over time of the engine speed in a case where an intake-air flow rate suppressing control is performed, in comparison with a change over time of the engine speed in a case where the intake-air flow rate suppressing control is not performed.

FIG. 5 is a graph showing a change over time of the engine speed in a case where the intake-air flow rate suppressing control is performed, in comparison with a change over time of the engine speed in a case where the intake-air flow rate suppressing control is not performed. In FIG. 5, the upper graph indicates the change over time of the engine speed in a case where the intake-air flow rate suppressing control is performed, while the lower graph indicates the change over time of the engine speed in a case where the intake-air flow rate suppressing control is not performed. In either case, at a time point when the engine speed has exceeded the upper limit engine speed, the cylinder combustion ceasing control is performed (indicated by FC in FIG. 5) and the engine speed is reduced because the combustion in the cylinder is not performed. As described above, in a state in which the combustion in the cylinder is not performed, the uncombusted gas easily reaches the catalyst 38, which causes the exhaust gas temperature to easily increase. Therefore, the temperature of the catalyst 38 may increase with an increase in the number of times the engine speed reaches the upper limit engine speed within the same time range.

In the intake-air flow rate suppressing control, the increase in the exhaust gas temperature is suppressed by suppressing the engine output while continuing the combustion in the cylinder. As shown in FIG. 5, the increase in the engine speed may be continued depending on the rider's operation. However, in this case, the engine speed increases gradually, compared to the case where the intake-air flow rate suppressing control is not performed. Therefore, within the same time range, the number of times the engine speed reaches the upper limit engine speed in a case where the intake-air flow rate suppressing control is performed becomes less than that in the case where the intake-air flow rate suppressing control is not performed. Thus, by performing the intake-air flow rate suppressing control for suppressing the engine output while continuing the combustion in the cylinder which increases the engine speed to some extent, the engine speed gradually increases and the increase in the exhaust gas temperature can be suppressed.

In the fuel amount increasing control, for example, the fuel injection amount of the sub-injector 41 is increased to be greater than that in the normal control. By increasing the fuel injection amount of the sub-injector 41 disposed inside the air-intake chamber 33, the fuel can be directly injected to the intake-air inside the air-intake chamber 33, and the temperature of the intake-air can be decreased. This makes it possible to facilitate a decrease in the temperature of the intake-air, compared to a case where the fuel injection amount of the main injector 31 is great.

Figure 6:
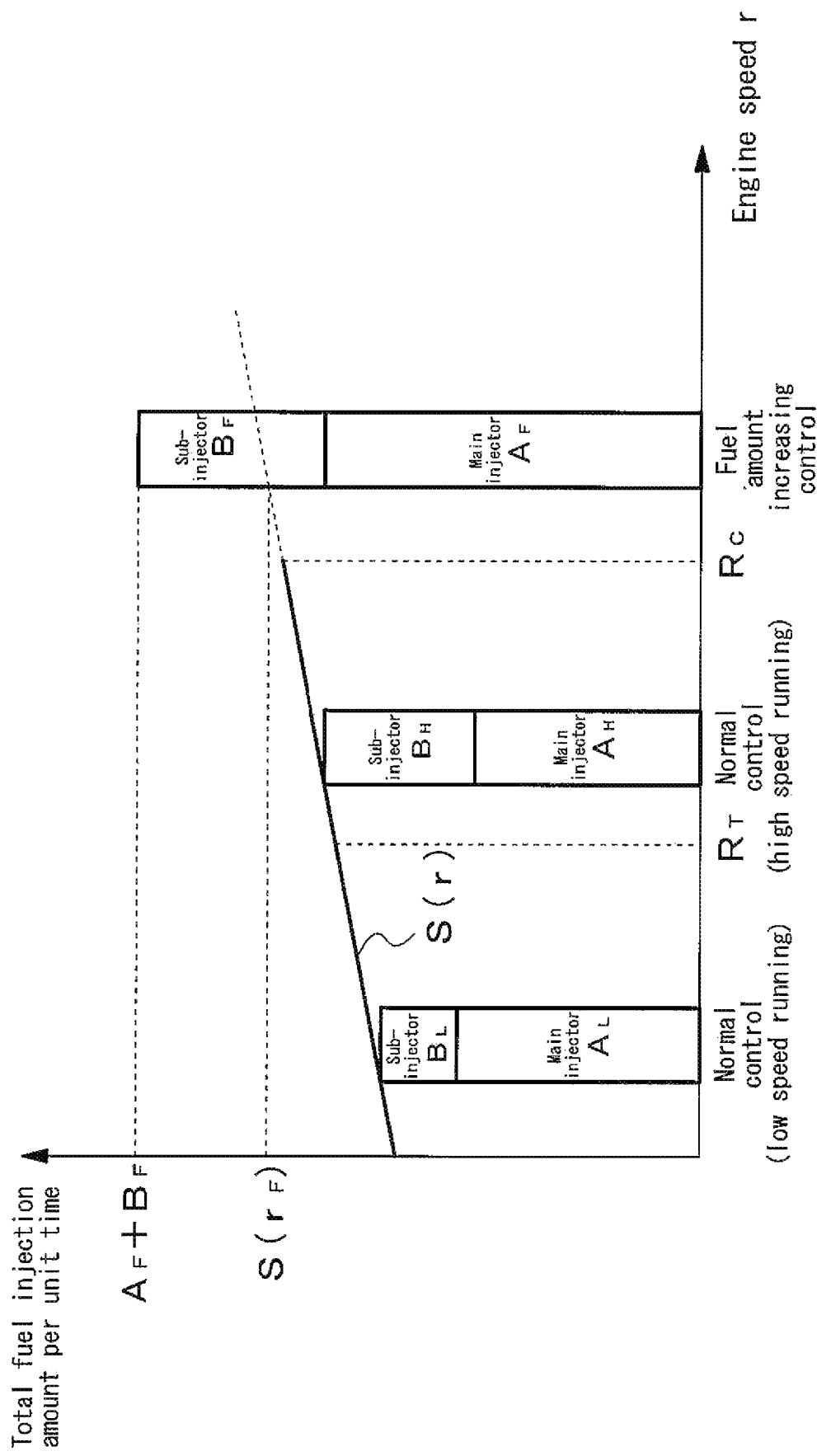
FIG. 6 is a graph showing fuel injection amounts of injectors according to the embodiment.

FIG. 6 is a graph showing the fuel injection amounts of the injectors according to the embodiment. FIG. 6 shows the total fuel injection amount per unit time with respect to the engine speed r. As shown in FIG. 6, during the normal control for which the fuel amount increasing control is not performed, the injectors 31, 41 are controlled so that the total fuel injection amount per unit time reaches a predetermined control function S(r) defined based on the engine speed. In the example of FIG. 6, the control function S(r) is defined as the function in which the total fuel injection amount per unit time increases linearly with respect to the engine speed (r). However, this is exemplary. It is sufficient that the value of the total fuel injection amount per unit time may be set based on the engine speed, by use of, for example, a non-linear function or a function including an area in which the total fuel injection amount decreases with an increase in the engine speed. In the motorcycle including the main injector 31 and the sub-injector 41, a fuel injection ratio between the main injector 31 and the sub-injector 41 is determined in advance. In this case, also, in the normal control, the fuel injection ratio between the main injector 31 and the sub-injector 41 may be changed more, in a case where the engine speed is equal to or higher than a predetermined engine speed (hereinafter this will be referred to as a normal control change engine speed) lower than the increase suppressing engine speed than in a case where the engine speed is lower than the normal control change engine speed. For example, as shown in FIG. 6, in a case where the engine speed r is lower than the normal control change engine speed $R_T$ (during low engine speed running: $r=r_L$), [the fuel injection amount of the main injector 31]:[the fuel injection amount of the sub-injector 41] is a ratio of $[A_L]:[B_L]$ ($A_L>0$, $B_L\geq0$, $A_L+B_L=S(r_L)$). Also, in a case where the engine speed r is equal to or higher than the normal control change engine speed $R_T$ and lower than the increase suppressing engine speed $R_C$ (during high engine speed running: $r=r_H$), [the fuel injection amount of the main injector 31]:[the fuel injection amount of the sub-injector 41] is a ratio of $[A_H]:[B_H]$ ($A_H>0$, $B_H\geq0$, $A_H>A_L$ or $B_H>B_L$, $A_H+B_H=S(r_H)$). In this way, although in the normal control, the fuel injection ratio between the main injector 31 and the sub-injector 41 is changed based on the engine speed, the total fuel injection amount per unit time is maintained at values on the control function S(r).

In contrast, in the fuel amount increasing control, as shown in FIG. 6, the total fuel injection amount per unit time is set to be larger than the value of the control function $S(r_F)$ ($r_F\geq R_C$) in the normal control. In this case, for example, [the fuel injection amount of the main injector 31]: [the fuel injection amount of the sub-injector 41] is a ratio of $[A_F]$: $[B_F]$ ($A_F\geq0$, $B_F\geq0$, $A_F+B_F>S$ ($r_F$), $r_F\geq R_C$). In the fuel amount increasing control, the total fuel injection amount may be increased without changing the fuel injection ratio between the main injector 31 and the sub-injector 41, or while changing the fuel injection ratio between the main injector 31 and the sub-injector 41. In a case where the fuel injection ratio is changed, the ratio of the fuel injection amount of the main injector 31 may be increased, or reduced. Further, the fuel injection amount of the sub-injector 41 may be increased while maintaining the fuel injection amount of the main injector 31.

By performing the fuel amount increasing control, the temperature of the intake-air can be reduced by evaporation heat of the fuel having been increased. Therefore, the increase suppressing control can be performed without suppressing the increase in the output of the engine E, and thus traveling feeling is affected less. In addition, since it is not necessary to additionally provide a particular device for cooling the intake-air, the temperature increase can be suppressed without increasing the number of members. Further, since the device for cooling the intake-air is not provided, the size of the engine E is not increased. Therefore, the engine E including the supercharging device 32 can be easily used as a drive source of the straddle-type vehicle such as the motorcycle, which particularly requires high space efficiency.

Figure 7:
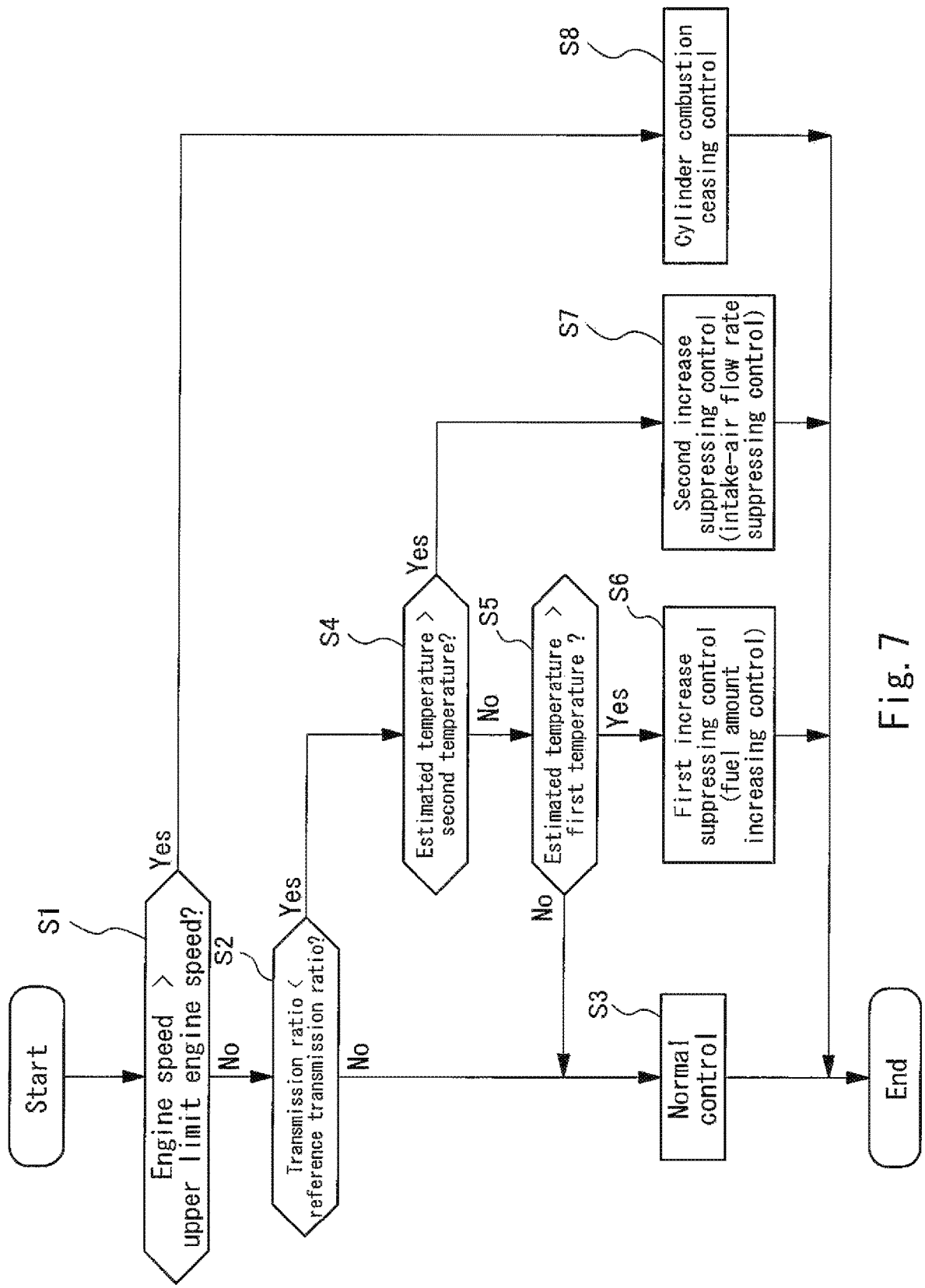
FIG. 7 is a flowchart showing a flow of the increase suppressing control and a determination process for the increase suppressing control according to the embodiment.

FIG. 7 is a flowchart showing a flow of the increase suppressing control and a determination process for the increase suppressing control according to the embodiment. In the present embodiment, the process along the flowchart of FIG. 7 is performed at every predetermined timing. The predetermined timing may be set in various ways, and may be, for example, a timing when the engine speed becomes equal to or higher than lowest one of increase suppressing engine speeds set to correspond to throttle valve opening degrees, respectively, a timing when the throttle valve opening degree or the throttle operation amount becomes equal to or higher than lowest one of opening degree thresholds set to correspond to the engine speeds, respectively, or every passage of a specified time.

Initially, the engine ECU 17 determines whether or not the engine speed received from the engine speed sensor 51 has exceeded the upper limit engine speed (step S1). When the engine ECU 17 determines that the engine speed has exceeded the upper limit engine speed (Yes in step S1), the engine ECU 17 performs the cylinder combustion ceasing control (step S8).

On the other hand, when the engine ECU 17 determines that the engine speed is equal to or lower than the upper limit engine speed (No in step S1), the engine ECU 17 continues to determine whether or not to perform the increase suppressing control. In the embodiment, the engine ECU 17 determines whether or not the transmission ratio corresponding to the gear position received from the gear position sensor 52 is lower than the preset reference transmission ratio (e.g., the transmission ratio corresponding to the 4th gear position) (step S2). When the engine ECU 17 determines that the transmission ratio is equal to or higher than the reference transmission ratio (e.g., the transmission ratio is the transmission ratio corresponding to one of the 1st to 4th gear positions) (No in step S2), the engine ECU 17 performs the normal control without performing the increase suppressing control (step S3).

On the other hand, when the engine ECU 17 determines that the transmission ratio is lower than the reference transmission ratio (Yes in step S2), the engine ECU 17 determines whether or not to perform the increase suppressing control by estimating the exhaust gas temperature (step S4, step S5).

In the present embodiment, the increase suppressing control includes the plurality of increase suppressing stages, and different initiation conditions are set to correspond to the increasing suppressing stages, respectively. A plurality of increase suppressing controls are set to correspond to the plurality of increase suppressing stages, respectively and are initiated at the respective stages. For example, the engine ECU 17 performs the fuel amount increasing control at a first increase suppressing stage at which the estimated exhaust gas temperature has exceeded a first predetermined temperature which is the increase suppressing temperature, and performs the intake-air flow rate suppressing control at a second increase suppressing stage at which the estimated exhaust gas temperature has exceeded a second predetermined temperature higher than the first predetermined temperature.

Figure 8:
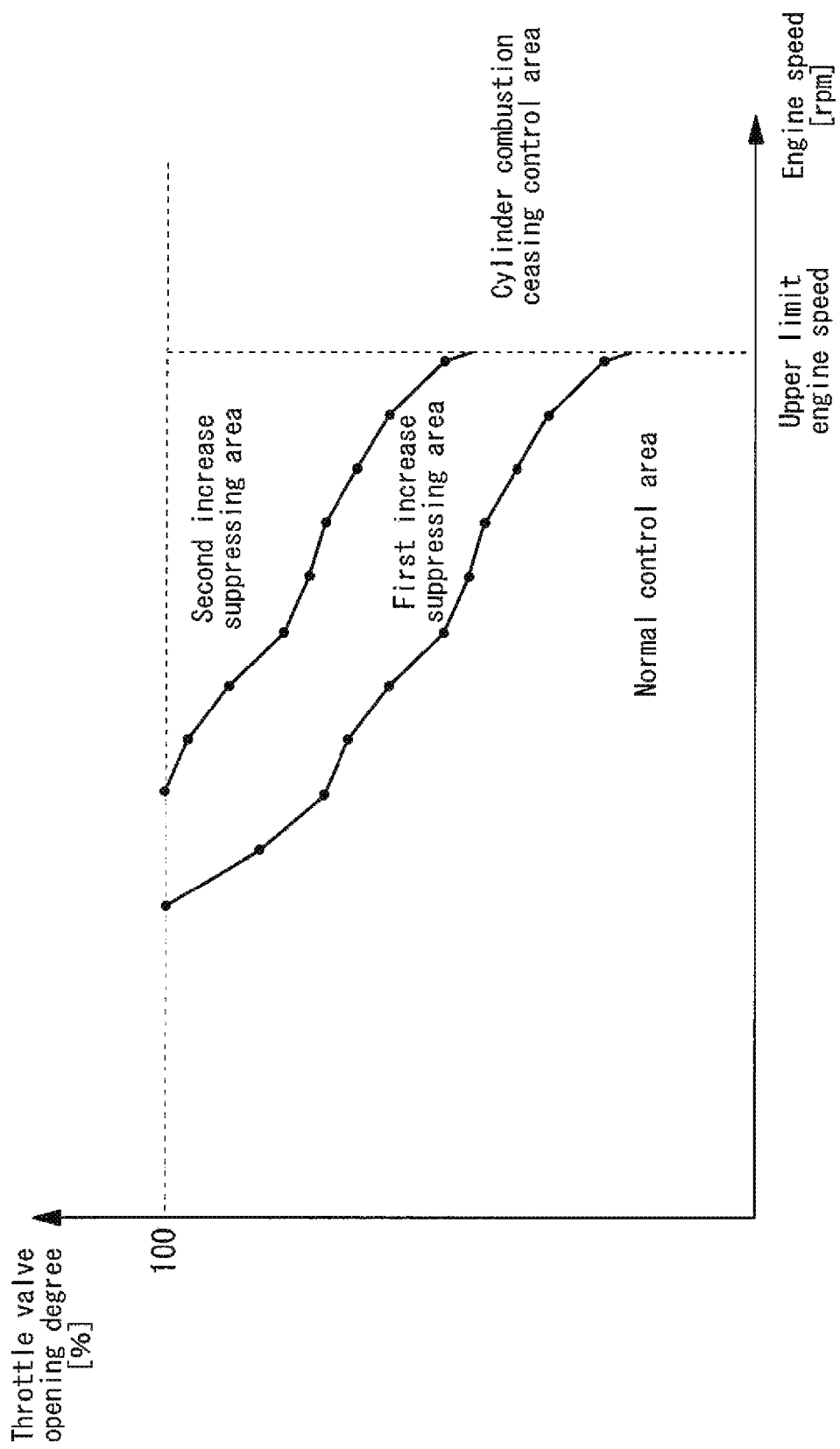
FIG. 8 is a graph showing the threshold of the throttle valve opening degree with respect to the engine speed, which defines each of initiation conditions at a plurality of increase suppressing stages of the increase suppressing control according to the embodiment.

FIG. 8 is a graph showing the threshold of the throttle valve opening degree corresponding to the engine speed, which defines the initiation condition of each of the first increase suppressing stage and the second increase suppressing stage, according to the present embodiment. FIG. 8 shows an example of setting, based on the example of FIG. 3. Specifically, FIG. 8 shows the example of the graph, in which an area including a first increase suppressing area in which the increase suppressing control at the first increase suppressing stage is performed, and a second increase suppressing area in which the increase suppressing control at the second increase suppressing stage is performed, is the same as the increase suppressing control area in which the increase suppressing control is performed, shown in FIG. 3.

The initiation condition of the first increase suppressing stage is similar to that of the increase suppressing control of FIG. 3. The initiation condition of the second increase suppressing stage is set in such a manner that the throttle valve opening degree is set to a larger value in an area in which the engine speed is higher than in the initiation condition of the first increase suppressing stage. The initiation condition of the first increase suppressing stage indicates a relation between the engine speed and the throttle valve opening degree in a case where the exhaust gas temperature is estimated at the first predetermined temperature. The initiation condition of the second increase suppressing stage indicates a relation between the engine speed and the throttle valve opening degree in a case where the exhaust gas temperature is estimated at the second predetermined temperature higher than the first predetermined temperature. The second predetermined temperature is set to a temperature lower than and closest to the catalyst permissible temperature. For example, in a case where the catalyst permissible temperature is 1400 degrees C., the first predetermined temperature and the second predetermined temperature are set to be lower than 1000 degrees C.

To perform the increase suppressing control including the above-described plurality of increase suppressing stages, in the flowchart of FIG. 7, the engine ECU 17 initially determines whether or not the estimated exhaust gas temperature is higher than the second predetermined temperature higher than the first predetermined temperature (step S4). When the engine ECU 17 determines that the estimated exhaust gas temperature is equal to or lower than the second predetermined temperature (No in step S4), the engine ECU 17 determines whether or not the estimated exhaust gas temperature is higher than the first predetermined temperature (step S5). When the engine ECU 17 determines that the estimated exhaust gas temperature is higher than the first predetermined temperature (Yes in step S5), the engine ECU 17 performs the fuel amount increasing control as the first increase suppressing control (step S6). On the other hand, when the engine ECU 17 determines that the estimated exhaust gas temperature is higher than the second predetermined temperature (Yes in step S4), the engine ECU 17 performs the intake-air flow rate suppressing control as the second increase suppressing control (step S7). When the engine ECU 17 determines that the estimated exhaust gas temperature is equal to or lower than the first predetermined temperature (No in step S5), the engine ECU 17 performs the normal control (step S3). In a case where the control for closing the throttle valve 21 and the control for suppressing the increase in the supercharging pressure can be performed as the intake-air flow rate suppressing control, the control for suppressing the increase in the supercharging pressure, and the control for closing the throttle valve 21 are preferably performed in this order.

As described above, in the present embodiment, the process along the flowchart of FIG. 7 is performed at every predetermined timing. Specifically, in a case where the first increase suppressing control was initiated before a previous timing, and the engine ECU 17 determines that the estimated exhaust gas temperature is higher than the second predetermined temperature at the present timing (Yes in step S4), the engine ECU 17 initiates the second increase suppressing control (step S7). At this time, the engine ECU 17 terminates the first increase suppressing control, and initiates the second increase suppressing control instead.

In a case where one of or both of the first increase suppressing control and the second increase suppressing control was/were initiated before a previous timing, and the engine ECU 17 determines that the estimated exhaust gas temperature is equal to or lower than the first predetermined temperature at the present timing (No in step S5), the engine ECU 17 terminates the increase suppressing control being performed, and restores the normal control (step S3). In the same manner, in a case where the cylinder combustion ceasing control was initiated before a previous timing, and the engine ECU 17 determines that the engine speed is equal to or lower than the upper limit engine speed at the present timing (No in step S1), the engine ECU 17 terminates the cylinder combustion ceasing control. Then, the engine ECU 17 determines whether or not to perform the increase suppressing control thereafter (step S2, step S4, step S5), and initiates the control (the normal control or the increase suppressing control) based on a result of the determination.

A threshold temperature used to terminate the increase suppressing control is set to be lower than the above-described threshold temperature (the first predetermined temperature or the second predetermined temperature) used to initiate the increase suppressing control. Specifically, the following setting may be made. A throttle valve opening degree which is smaller by a predetermined value than the threshold of the throttle valve opening degree which is set based on the engine speed as the initiation condition of the increase suppressing control is set as the threshold of the throttle valve opening degree which is used to terminate the increase suppressing control. When the throttle valve opening degree corresponding to the engine speed becomes equal to or lower than the threshold used to terminate the increase suppressing control, the engine ECU 17 may terminate the increase suppressing control. In this way, by allowing each of the temperature at which the increase suppressing control is initiated and the temperature at which the increase suppressing control is terminated to have a hysteresis, it becomes possible to prevent a situation in which frequent repetition of initiation and termination of the increase suppressing control take places at a temperature that is close to the threshold. Further, for example, when the increase suppressing control such as the intake-air flow rate suppressing control is initiated and/or terminated, a tailing control for gradually changing the engine output per unit time is preferably performed.

As described above, in the present embodiment, the engine ECU 17 performs the increase suppressing control in such a manner that the fuel amount increasing control for increasing the amount of fuel to be supplied to the engine E so as to make the amount of fuel greater than that in a case where the fuel amount increasing control is not performed is firstly performed, and then the intake-air flow rate suppressing control for suppressing the intake-air flow rate is performed so as to make the intake-air flow rate lower than that in a case where the intake-air flow rate suppressing control is not performed. In accordance with this configuration, the increase suppressing control is performed in a stepwise manner (in stages), and thus the engine control which does not affect the traveling feeling so much can be firstly performed. In particular, the fuel amount increasing control which is capable of lowering the exhaust gas temperature without suppressing the engine output is initiated at a temperature (temperature which is equal to or lower than the second predetermined temperature and higher than the first predetermined temperature) which is much lower than the catalyst permissible temperature. This makes it possible to prevent a rapid increase in the exhaust gas temperature while reducing a change in the traveling feeling. In a case where the exhaust gas temperature is likely to exceed the catalyst permissible temperature even after such a control is performed, the control for suppressing the increase in the supercharging pressure applied by the supercharging device 32 is performed to suppress the increase in the engine output, and thus a further increase in the exhaust gas temperature can be prevented. Since the engine speed can be gradually increased by performing the control for suppressing the increase in the engine output, it becomes possible to prevent the engine speed from reaching the upper limit engine speed. Therefore, even if the engine speed reaches the upper limit engine speed, the number of times per unit time the engine speed reaches the upper limit engine speed can be reduced, which makes it difficult to form a situation in which the exhaust gas temperature increases.

Further, as the second increase suppressing control, the engine ECU 17 may retard the ignition timing in the engine E, or suppress the fuel injection amount, in addition to or instead of the intake-air flow rate suppressing control. Further, the increase suppressing control may be composed of three or more increase suppressing stages, and the fuel amount increasing control, the intake-air flow rate suppressing control, the control for retarding the ignition timing, and the control for suppressing the fuel injection amount may be performed in a specified order. For example, the fuel amount increasing control may be firstly performed, and then the intake-air flow rate suppressing control and the control for retarding the ignition timing may be performed as the estimated exhaust gas temperature increases. Or, the intake-air flow rate suppressing control and the control for retarding the ignition timing may be firstly performed, and then the fuel amount increasing control may be performed, as the exhaust gas temperature increases.

Although in the above-described method, the second predetermined temperature at which the second increase suppressing control which is the control for suppressing the increase in the engine output is initiated is set to be higher than the first predetermined temperature at which the first increase suppressing control which is the control for increasing the fuel injection amount is initiated, the second predetermined temperature may be set to be lower than the first predetermined temperature. Specifically, the second increase suppressing control as the control for suppressing the increase in the engine output may be firstly performed with an increase in the exhaust gas temperature, and then the first increase suppressing control which is the control for increasing the fuel injection amount may be performed if the exhaust gas temperature further increases.

Thus far, the embodiment of the present embodiment has been described. The present invention is not limited to the above-described embodiment.

Figure 9:
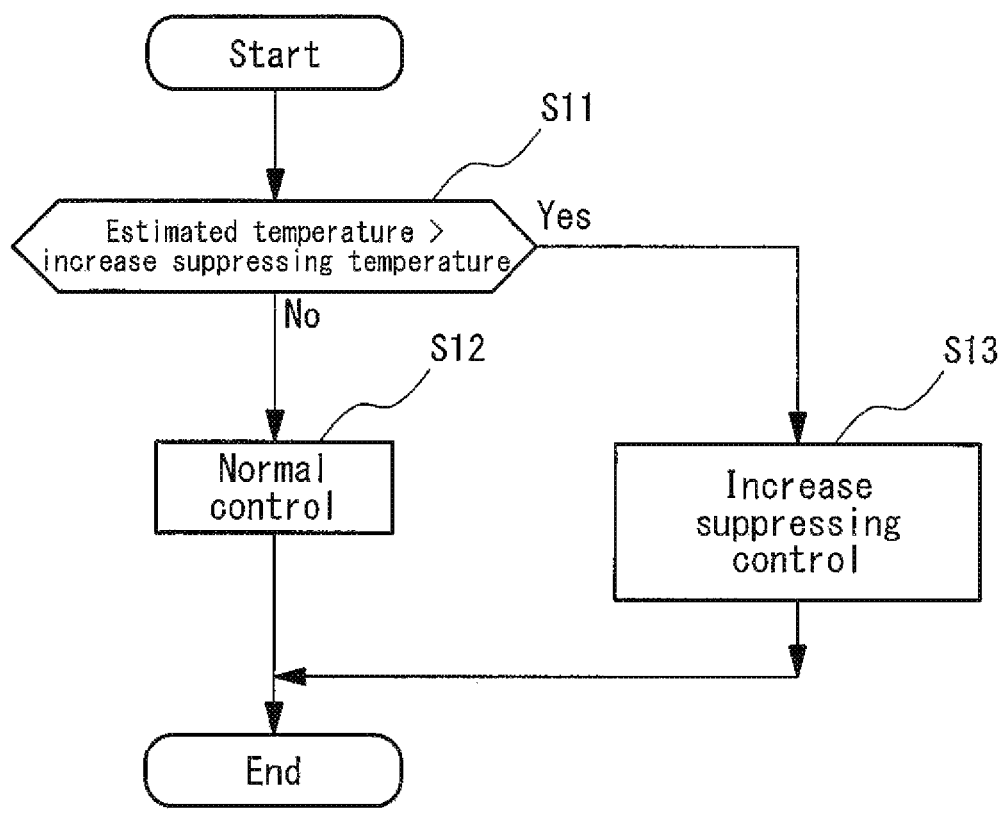
FIG. 9 is a flowchart showing a flow of the increase suppressing control and the determination process for the increase suppressing control according to a modified example of the embodiment.

For example, although in the above-described embodiment, the increase suppressing engine speed is set in a case where the transmission ratio of the transmission 14 is lower than the predetermined value, the increase suppressing engine speed may be set irrespective of the transmission ratio. FIG. 9 is a flowchart showing a flow of the increase suppressing control and a determination process for the increase suppressing control according to a modified example of the embodiment. In the present modified example, as shown in FIG. 9, the engine ECU 17 initially determines whether or not the estimated exhaust gas temperature is higher than the increase suppressing temperature (step S11). When the engine ECU 17 determines that the estimated exhaust gas temperature is equal to or lower than the increase suppressing temperature (No in step S11), the engine ECU 17 performs the normal control (step S12). When the engine ECU 17 determines that the estimated exhaust gas temperature is higher than the increase suppressing temperature (Yes in step S11), the engine ECU 17 performs the increase suppressing control (step S13). In the present modified example, also, the above-described determination and control are performed at every predetermined timing.

The control to be performed as the increase suppressing control may be switched based on the transmission ratio. For example, the intake-air flow rate suppressing control may be performed when the transmission ratio (corresponding to one of the 1st to 4th gear positions) is equal to or higher than the reference transmission ratio corresponding to the 4th gear position, while the fuel amount increasing control may be performed when the transmission ratio (corresponding to one of the 5th to 6th gear positions) is lower than the reference transmission ratio.

The methods of the increase suppressing controls are not limited to the above-described embodiment, and the order and combination of these controls may be varied. For example, after all of the control for suppressing the increase in the supercharging pressure, the control for retarding the ignition timing, and the fuel amount increasing control have been performed, the throttle valve 21 may be controlled to be closed. For example, the fuel amount increasing control may be performed in a case where the engine speed is high, to be precise, a case where the engine speed becomes high for a moment. Further, for example, in a case where the engine ECU 17 determines that the motorcycle is decelerated by engine braking or downshift has occurred, based on the throttle valve opening degree, the vehicle speed, the transmission ratio, etc., the engine ECU 17 may perform the fuel amount increasing control.

Although in the above-described embodiment, the total fuel injection amount per unit time is increased in the fuel amount increasing control, the fuel injection ratio of the sub-injector 41 may be increased instead of increasing the total fuel injection amount per unit time. This makes it possible to suppress the increase in the exhaust gas temperature due to the decrease in the intake-air temperature while preventing an air-fuel ratio from approaching a fuel-rich ratio.

The throttle valve 21 may be configured as a mechanical throttle in which the throttle valve 21 is connected to the throttle grip 7 via a throttle wire. In addition to the throttle valve 21 configured as the electronically controlled throttle or the mechanical throttle, a sub-throttle valve configured as the electronically controlled throttle may be provided in the air-intake passage 20 at a location that is upstream of the throttle valve 21.

The control to be performed as the increasing suppressing control may be switched depending on a driving state of the motorcycle 1. For example, in a case where the engine ECU 17 determines that the motorcycle 1 is traveling at a relatively constant vehicle speed or at a relatively high vehicle speed, the engine ECU 17 performs the control for suppressing the increase in the supercharging pressure and/or the control for closing the throttle valve 21. This makes it possible to properly perform the control in a case where the engine E continues to run in an engine speed range which is close to the upper limit engine speed.

Although in the above-described embodiment, an intercooler for cooling the air-intake chamber 33 is not provided, the present invention may be applied to a straddle-type vehicle including the intercooler. Although in the above-described embodiment, the motorcycle has been exemplarily described as the straddle-type vehicle, the straddle-type vehicle is not limited to the motorcycle, and may be other kinds of straddle-type vehicles. For example, the straddle-type vehicle may be a four-wheeled vehicle having a residence space, such as a multi-purpose vehicle, or a vehicle such as a small ship.

Although in the above-described embodiments, the engine ECU 17 functions as the control section which performs the increase suppressing control, a control section different from the engine ECU 17 may perform the determination of whether or not to perform the above-described increase suppressing control, and the above-described increase suppressing control. The control section different from the engine ECU 17 may be, for example, the existing sub-ECU, or a control section (ECU) for exclusive use, which is additionally provided. Further, the increase suppressing control may be performed by a control section different from a control section which performs the cylinder combustion ceasing control.

In a case where the exhaust gas temperature has exceeded the catalyst permissible temperature, a control for further suppressing the exhaust gas temperature may be performed. For example, in the increase suppressing control, the effect of suppressing the engine output is reduced while providing a priority to the traveling feeling, while in a case where the exhaust gas temperature has exceeded the catalyst permissible temperature, a control for suppressing the engine output more effectively may be performed while providing a priority to suppressing the increase in the exhaust gas temperature. In brief, specified controls may be performed in a stepwise manner. For example, in the increase suppressing control, a combustion state may be maintained while reducing the amount of the engine output to be suppressed, while in the control performed in a case where the exhaust gas temperature has exceeded the catalyst permissible temperature, the combustion state may be maintained while increasing the amount of the engine output to be suppressed.

The determination of whether or not the exhaust gas temperature has exceeded the catalyst permissible temperature is performed based on the engine speed and the value corresponding to the throttle valve opening degree, as in the case of setting the increase suppressing engine speed. Specifically, the engine speed (hereinafter this will be referred to as a catalyst limit engine speed) at which the exhaust gas temperature is estimated to reach the catalyst permissible temperature is set based on the throttle valve opening degree. The catalyst limit engine speed is set to be higher than the corresponding increase suppressing engine speed. As described above, in the increase suppressing control and the control performed in the case where the exhaust gas temperature has exceeded the catalyst permissible temperature, the engine output suppressing control (the intake-air flow rate suppressing control) other than the cylinder combustion ceasing control, or the fuel amount increasing control in a state in which the engine output is maintained is performed. Therefore, these controls can prevent the increase in the exhaust gas temperature more effectively than a fuel cut-off control.

The catalyst limit engine speed may be set independently of the upper limit engine speed. For example, the upper limit engine speed may be selected as desired by the rider. Therefore, the catalyst limit engine speed may be higher or lower than the upper limit engine speed. The content of the cylinder combustion ceasing control may be changed between a case where the engine speed has exceeded the catalyst limit engine speed and a case where the engine speed has exceeded the upper limit engine speed.

Although in the above-described embodiment, the exhaust gas temperature is estimated based on the engine speed and the value corresponding to the throttle valve opening degree without use of an exhaust gas temperature sensor, this is exemplary. The exhaust gas temperature sensor may be provided in the exhaust passage 37, and it may be determined whether or not to perform the above-described increase suppressing control based on the temperature received from the exhaust gas temperature sensor.

Although in the above-described embodiment, the throttle valve opening degree received from the throttle valve opening degree sensor 53 is used as the value corresponding to the throttle valve opening degree which is used to estimate the exhaust gas temperature, the throttle operation amount received from the throttle operation amount sensor 54 or an air-intake pressure such as the pressure (internal pressure) in the air-intake chamber 32 may be used.

Further, in the estimation of the exhaust gas temperature, other conditions such as a cooling water temperature, an intake-air temperature, an outside air temperature, and a traveling speed may be added to the engine speed and the value corresponding to the throttle valve opening degree.

Numerous improvements and alternative embodiment of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The straddle-type vehicle of the present invention is effectively used to reduce effects on traveling feeling which are caused by performing an engine control, while performing the engine control according to a state of an exhaust gas.

LIST OF REFERENCE CHARACTERS 1 motorcycle (straddle-type vehicle)
14 transmission
17 engine ECU (control section)
32 supercharging device
37 exhaust passage
38 catalyst
E engine

The invention claimed is:

1. A straddle-type vehicle comprising:
a supercharger which compresses intake-air to be sent to a combustion chamber of an engine;
a catalyst provided in an exhaust passage through which an exhaust gas emitted from the engine flows;
an electronic control unit (ECU) which controls the engine; and
a transmission provided in a driving power transmission path from the engine to a drive wheel,
wherein a current transmission ratio of the transmission is among a plurality of transmission ratios,
wherein the ECU performs an increase suppressing control for suppressing an increase in an exhaust gas temperature, in a case where the ECU estimates that the exhaust gas temperature has exceeded an increase suppressing temperature set to be equal to or lower than a catalyst permissible temperature, the current transmission ratio is less than a preset reference transmission ratio, and an engine speed of the engine is lower than a predetermined upper limit engine speed.

2. The straddle-type vehicle according to claim 1,
wherein the ECU performs a cylinder combustion ceasing control for ceasing combustion in a cylinder of the engine in a case where a predetermined cylinder combustion ceasing condition is met, and
wherein an initiation condition of the increase suppressing control is set so that the increase suppressing control is performed before the cylinder combustion ceasing control is performed.

3. The straddle-type vehicle according to claim 2, wherein the ECU performs the cylinder combustion ceasing control in a case where the engine speed has reached the predetermined upper limit engine speed, and wherein the ECU performs the increase suppressing control in a case where the engine speed has exceeded an increase suppressing engine speed set to be lower than the predetermined upper limit engine speed.

4. The straddle-type vehicle according to claim 1,
wherein the ECU estimates whether or not the exhaust gas temperature has exceeded the increase suppressing temperature set to be equal to or lower than the catalyst permissible temperature, based on a value corresponding to a throttle valve opening degree and the engine speed.

5. The straddle-type vehicle according to claim 1,
wherein the ECU performs the increase suppressing control in such a manner that an intake-air flow rate is suppressed to be lower than that in a case where the increase suppressing control is not performed.

6. The straddle-type vehicle according to claim 5,
wherein the ECU performs the increase suppressing control in such a manner that a cross-sectional area of an air-intake passage becomes smaller than that in a case where the increase suppressing control is not performed.

7. The straddle-type vehicle according to claim 5,
wherein the ECU performs the increase suppressing control in such a manner that an increase in a supercharging pressure applied by the supercharger is suppressed more than in a case where the increase suppressing control is not performed.

8. The straddle-type vehicle according to claim 6,
wherein the ECU performs the increase suppressing control in such a manner that an amount of fuel to be supplied to the engine is increased to be greater than that in a case where the increase suppressing control is not performed.

9. The straddle-type vehicle according to claim 6,
wherein the increase suppressing control includes a plurality of increase suppressing stages, and initiation conditions which are different and are used to initiate the plurality of increase suppressing stages, respectively, are set to correspond to the plurality of increase suppressing stages, respectively.

10. The straddle-type vehicle according to claim 5,
wherein the ECU performs the increase suppressing control in such a manner that an amount of fuel to be supplied to the engine is increased to be greater than that in a case where the increase suppressing control is not performed, and then the intake-air flow rate is suppressed to be lower than that in a case where the increase suppressing control is not performed.

11. The straddle-type vehicle according to claim 6,
wherein a condition used to initiate the increase suppressing control is set so that the increase suppressing control is performed more easily in a case where a first transmission ratio of the plurality of transmission ratios is selected by the transmission than in a case where a second transmission ratio of the plurality of transmission ratios is selected by the transmission, the first transmission ratio being lower than the second transmission ratio.

12. A straddle-type vehicle comprising:
a supercharger which compresses intake-air to be sent to a combustion chamber of an engine;
a catalyst provided in an exhaust passage through which an exhaust gas emitted from the engine flows;
an electronic control unit (ECU) which controls the engine;
a transmission provided in a driving power transmission path from the engine to a drive wheel;
an air-intake chamber disposed downstream of the supercharger and upstream of the engine;
a main fuel injector; and
a sub-fuel injector,
wherein a current transmission ratio of the transmission is selected from a plurality of transmission ratios,
wherein the ECU performs an increase suppressing control for suppressing an increase in an exhaust gas temperature, in a case where the ECU estimates that the exhaust gas temperature has exceeded an increase suppressing temperature set to be equal to or lower than a catalyst permissible temperature, wherein a condition used to initiate the increase suppressing control is set to vary based on the current transmission ratio,
wherein the sub-fuel injector is configured to inject fuel into the air-intake chamber,
wherein the main fuel injector is disposed downstream of the air-intake chamber, and
wherein the ECU performs the increase suppressing control in such a manner that a fuel injection amount of the sub-fuel injector is increased to be greater than that in normal control.

* * * * *